(12) United States Patent
Nerieri (10) Patent No.: US 9,509,653 B2
(45) Date of Patent: Nov. 29, 2016

(54) SYSTEMS AND METHODS FOR DIRECTING MESSAGES TO MULTIPLE USER PROFILES ON A MOBILE DEVICE

(71) Applicant: Google Inc., Mountain View, CA (US)

(72) Inventor: Francesco Nerieri, Santa Cruz, CA (US)

(73) Assignee: Google Inc., Mountain View, CA (US)

( * ) Notice: Subject to any disclaimer, the term of this patent is extended or adjusted under 35 U.S.C. 154(b) by 455 days.

(21) Appl. No.: 13/844,058

(22) Filed: Mar. 15, 2013

(65) Prior Publication Data

US 2014/0122623 A1 May 1, 2014

Related U.S. Application Data (60) Provisional application No. 61/719,778, filed on Oct. 29, 2012.

(51) Int. Cl.
*H04L 12/58* (2006.01)
*H04L 29/08* (2006.01)

(52) U.S. Cl.
CPC .............. *H04L 51/32* (2013.01); *H04L 51/14* (2013.01); *H04L 51/24* (2013.01); *H04L 67/146* (2013.01); *H04L 67/306* (2013.01); *H04L 51/38* (2013.01); *H04L 67/26* (2013.01)

(58) Field of Classification Search
CPC ............. H04L 29/08072; H04L 29/06; H04L 29/12066; G06Q 10/107
USPC ................ 709/203, 206, 207, 227, 228, 245
See application file for complete search history.

(56) References Cited

U.S. PATENT DOCUMENTS

| | | | |
|---|---|---|---|
| 6,745,193 B1 | 6/2004 | Horvitz et al. | |
| 8,316,020 B1 * | 11/2012 | Kleinmann | G06F 17/30035 707/734 |
| 8,699,413 B2 * | 4/2014 | Ring | H04L 67/141 370/328 |
| 2002/0156889 A1 * | 10/2002 | Crudele | G06F 8/61 709/224 |
| 2002/0173308 A1 * | 11/2002 | Dorenbosch | H04L 12/581 455/435.1 |
| 2003/0153288 A1 | 8/2003 | Nakatsuyama | |

(Continued)

FOREIGN PATENT DOCUMENTS

WO 2012/106411 A1 8/2012

OTHER PUBLICATIONS

PCT/US2013/067272 International Search Report and Written Opinion, Mailed Jun. 16, 2014.

*Primary Examiner* — Backhean Tiv
(74) *Attorney, Agent, or Firm* — Troutman Sanders LLP; James E. Schutz; Scott D. Barnett (57) ABSTRACT

The disclosed technology covers messaging systems and methods, and computer program products embodying such systems and methods. An example computer-implemented method includes receiving, at a message server, a plurality of messages for a plurality of remote mobile devices; and providing a single network connection between the message server and a first mobile device of the plurality of mobile devices. The first mobile device may have a first user profile and a second user profile, each with its own applications and preferences. The method may include associating the first user profile with a first user identifier, and the second user profile with a second identifier. When a message is received, and directed toward the first user profile, the method may include packaging the first message with the first user identifier, and transmitting the first message, along with the first user identifier, to the first mobile device.

19 Claims, 4 Drawing Sheets

(56) References Cited

U.S. PATENT DOCUMENTS

| | | | |
|---|---|---|---|
| 2004/0008619 A1* | 1/2004 | Doshi | H04L 69/40 370/217 |
| 2007/0294336 A1 | 12/2007 | Pounds et al. | |
| 2012/0079045 A1* | 3/2012 | Plotkin | H04L 12/585 709/206 |
| 2012/0117250 A1* | 5/2012 | Santamaria et al. | 709/227 |
| 2012/0117568 A1* | 5/2012 | Plotkin | G06F 9/4843 718/100 |
| 2012/0324041 A1* | 12/2012 | Gerber | H04L 67/26 709/217 |
| 2013/0054701 A1* | 2/2013 | Leeder | G06Q 50/01 709/205 |
| 2013/0198299 A1* | 8/2013 | Chhaochharia et al. | 709/206 |
| 2014/0089193 A1* | 3/2014 | Boding | G06Q 20/382 705/44 |
| 2014/0113646 A1* | 4/2014 | Maggenti | H04L 67/306 455/452.1 |
| 2014/0349633 A1* | 11/2014 | Sajadieh et al. | 455/418 |

* cited by examiner

SYSTEMS AND METHODS FOR DIRECTING MESSAGES TO MULTIPLE USER PROFILES ON A MOBILE DEVICE

CROSS-REFERENCE TO RELATED APPLICATIONS

This application claims priority and the benefit under 35 U.S.C. §119(e) of U.S. Provisional Patent Application No. 61/719,778, filed 29 Oct. 2012, of which the entire contents and substance are hereby incorporated by reference as if fully set forth below.

BACKGROUND

Push notification services are in widespread use for sending messages to various computing devices, including mobile devices. For example, a push notification may be sent from a message server to a user's mobile device to notify the user of receipt of a new email message. Push services can reduce the required work of a mobile device by relieving the mobile device of the need to check continuously for new email or other new messages from remote servers.

In conventional mobile devices, only a single user profile is supported. As such, conventional message-delivery architecture supports a single connection between a mobile device and the message server. Push messages are generally delivered from the message server to the mobile device across this single connection, and then processed at the mobile device by the single user profile.

SUMMARY

Various implementations of the disclosed technology may manage push message delivery to computing devices with multiple user profiles, based at least in part on the status of those user profiles.

In one implementation, a computer-implemented method of the disclosed technology includes receiving, at a message server or other computing system, a plurality of messages for a plurality of remote mobile devices; and providing a single network connection between the computing system and a first mobile device of the plurality of mobile devices. The first mobile device may have a first user profile and a second user profile. A first instance of an application may run on the first user profile, while a second instance of the application runs on the second user profile, independent of the first instance. The method may include associating the first user profile with a first user identifier, and the second user profile with a second identifier. When a message is received, and directed toward the first user profile, the method may include packaging the first message with the first user identifier, based on the first message being directed to the first user profile; and transmitting the first message, along with the first user identifier, to the first mobile device.

In another implementation, a computer program product of the disclosed technology may embody a method that includes receiving a plurality of messages from an application server associated with an application, where the plurality of messages are directed toward a plurality of mobile devices at remote locations. The method may further include associating a first registration identifier with a first instance of the application running on a first user profile of a mobile device, and associating a second registration identifier with a second instance of the application running on a second user profile of the mobile device. Each of the first and second user profiles may have its own set of applications and preferences. The method may further include identifying a first message in the plurality of messages as being directed toward the first instance of the application; and pushing the first message to the mobile device, with a first user identifier representing the first user profile.

In another implementation, a messaging system of the disclosed technology may include a message server or other computing system, a database, and a communication interface. The computing system may be in communication with a plurality of mobile devices, including a first mobile device having a first user profile and a second user profile. The computing system may be configured to receive a plurality of messages, each including an associated registration identifier. The database may be configured to map a first registration identifier of a first message to the first user profile, and to map a second registration identifier of a second message to the second user profile. The communication interface may be configured to connect to the mobile device over a single network connection. The computing system may be further configured to multiplex the single network connection by transmitting the first message to the mobile device with a first user identifier associated with the first user profile, and by transmitting the second message to the mobile device with a second identifier associated with the second user profile.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Many mobile devices currently use push messaging to receive data. A push message is data transmitted to the mobile device without prompting, or without the mobile device first having to check for messages. A message may be directed to a mobile device from, for example, an application server remote from the mobile device. In some instances, the message may be transmitted from the application server to a message server, which may manage message delivery for a plurality of mobile devices receiving push messages from a plurality of sources.

A mobile device may have more than one user profile. Each user profile may represent a different user, or virtual user, of the mobile device. Each user may experience a different state of the user device, where that state is customized with the associated user's applications, preferences, or workspace arrangements. A first user having a first user profile on a mobile device may see a different set of applications than are seen by a second user having a second user profile on the same mobile device. In an example implementation, all or a portion of the second user's data in the second user profile may be inaccessible by the first user in the first user profile. In an example implementation, each user of a mobile device may have his own user name and password, and may be required to authenticate himself to the mobile device to access his user profile.

In a device with multiple user profiles, a particular user profile may be an active profile, a background profile, or a stopped profile. An active profile may be the user profile that is currently in use on the mobile device. A background profile may be a user profile that is not an active user but is running in the background and may therefore be able to receive messages. A stopped profile may be currently not running on the computing device, and thus may be unable to process commands.

The existence of multiple user profiles can add further considerations to the messaging system's role of managing message delivery.

The disclosed technology recognizes that, despite the user of multiple user profiles at a mobile device, there may exist only a single current connection between the mobile device and messaging server. This can be the case for various reasons. For example, since conventional mobile devices use only a single user profile, the messaging system 400 may be forced to operate over an architecture that allows only a single connection per mobile device. Alternatively, it may drain battery power in the mobile device to keep multiple connections alive. Accordingly, an example implementation of the disclosed technology is able to use a single connection for message delivery to multiple user profiles.

Referring now to the figures, in which like reference numerals represent like parts throughout the views, various implementations of the messaging systems and methods will be described in detail.

Figure 1:
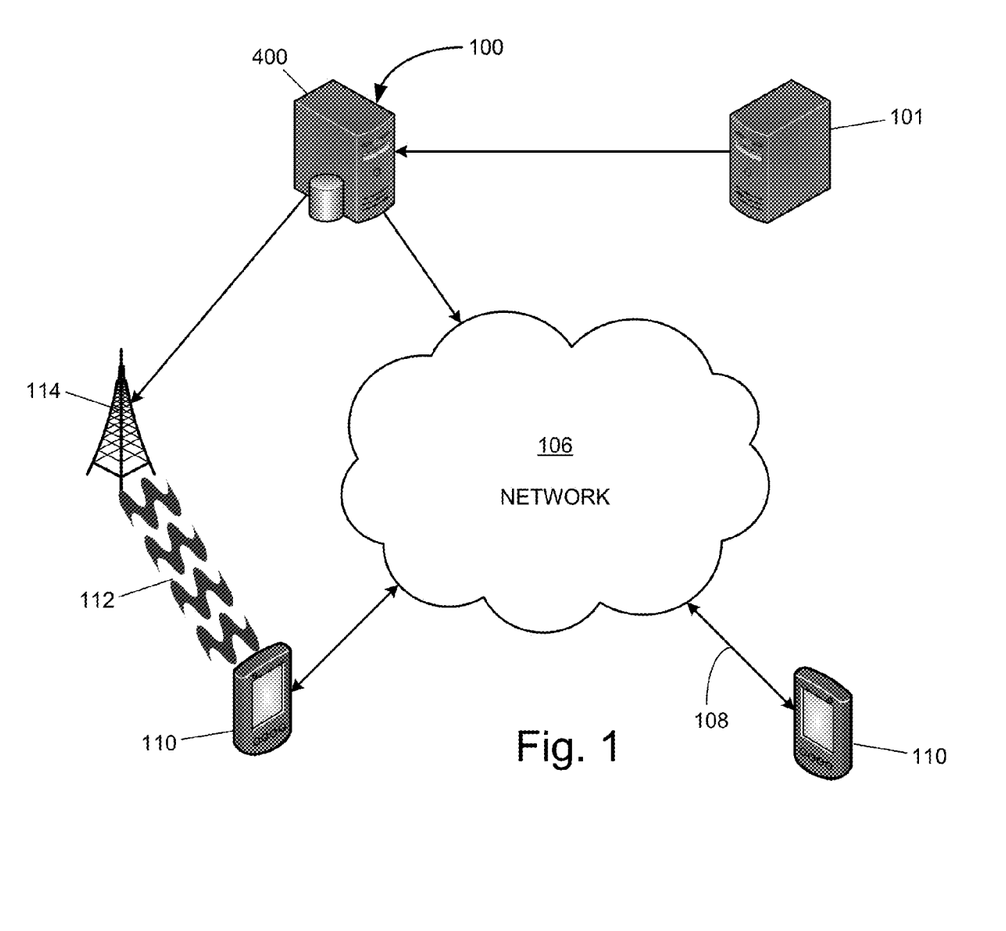
FIG. 1 is a block diagram of an illustrative messaging system according to an example implementation.

FIG. 1 is a block diagram of an illustrative messaging system 100 according to the disclosed technology. The messaging system 100 may be embodied, in whole or in part, in a message server 400 in communication with one or more application servers 101. The message server 400 may be or include a computer system, such as that illustrated in FIG. 4.

Referring to FIG. 1, the message server 400 may receive messages from the application server 101. The application servers 101 may be servers supporting applications installed on, or running on, the computing devices 110. The message server 400 may communicate the received messages by push messaging to various computing devices 110, such as a mobile device, desktop computer, or laptop computer.

It will be understood that there are numerous categories of computing devices 110, including mobile devices, with multiple user profiles may benefit from the disclosed technology. For example, computing devices 110 can include, but are not limited to, portable computers, tablets, Internet tablets, netbooks, e-readers, personal data assistants, ultra mobile personal computers, and smartphones.

The message server 400 may communicate with the computing device 110 in various ways. For example, the message server 400 may communicate with the computing device 110 through a Wi-Fi channel or another Internet connection 108, and may utilize a network 106 for communication with the computing device 110. For another example, the message server 400 may communicate to the computing device 110 through a service provider 114, such as a cellular service provider or other network provider supporting mobile devices. The service provider 114 may provide cellular service through cellular radio channels 112 for communicating with the computing device 110. In that case, the message server 400 may communicate or send messages to the computing device 110 through the service provider 114.

The message server 400 may be in communication with a plurality of computing devices 110 belonging to a plurality of users. One or more of these computing devices may have multiple user profiles, as discussed above. Further, the message server 400 may receive a plurality of messages for the various user profiles. The message server 400 may sort the received messages and associate each message with its intended-recipient user profile.

Instead of delivering all messages to the appropriate computing devices 110 of the user profiles immediately upon receipt, the message server 400 may batch certain messaging for future deliver, and may deliver other messages as soon as possible.

Figure 2:
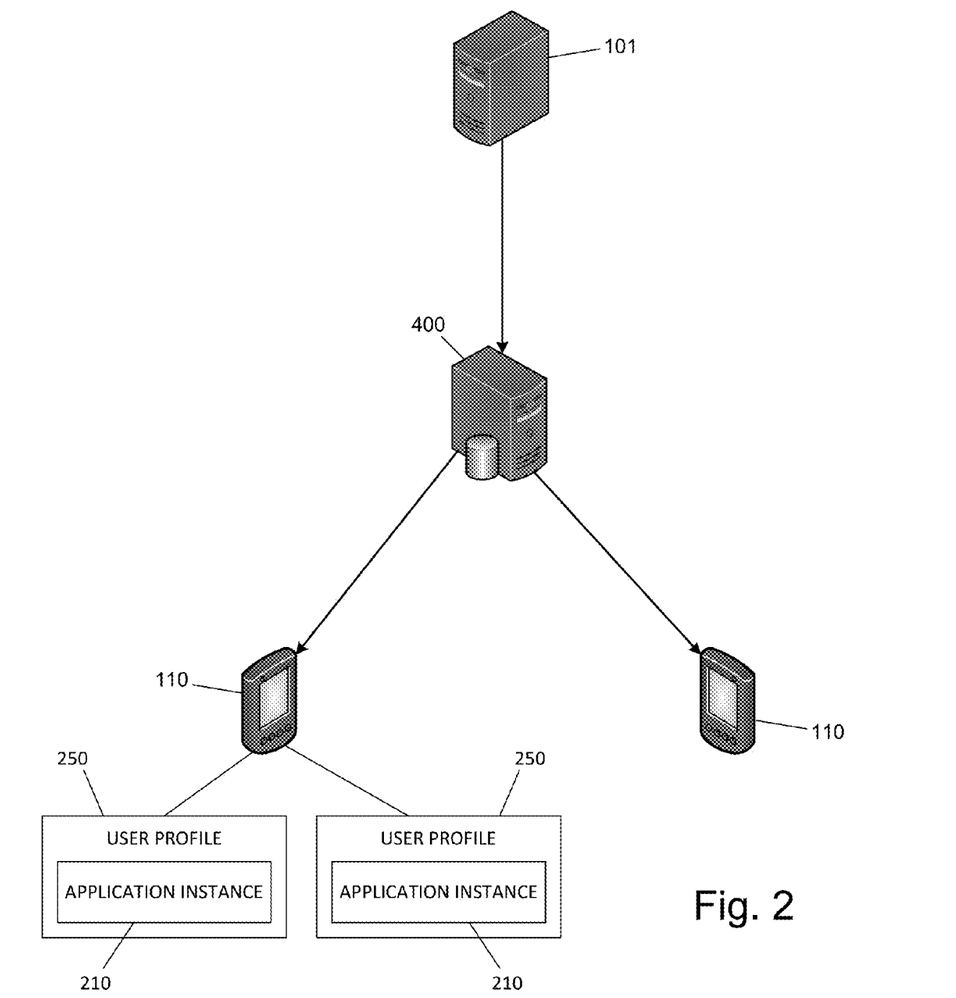
FIG. 2 is a bock diagram of the messaging system where multiple instances of an application exist on a mobile device, according to an implementation.

FIG. 2 is a bock diagram of the messaging system 100 where multiple instances of an application exist on a mobile device, according to an implementation of the disclosed technology. As shown in FIG. 2, multiple instances 210 of a single application may run on a single computing device 110, where each application instance 210 is associated with a distinct user profile 250 on the computing device 110. Each application instance 210 running on a device may be independent of other application instances 210. In some implementations, this independence means maintaining separate application data for the application instances 210 of the various user profiles 250. From the view of the application server 101, each application instance 210, regardless of which computing device 110 runs that instance, registers with the application server 101 and has a unique registration identifier.

In some example implementations, the application server 101 is unaware of, or unconcerned with, the use of multiple user profiles 250 on the computing devices 110. The application server 101 may recognize application instances by their registration identifiers, and not by their particular computing devices 110. Further, in some implementations, the message server 400 may assign the registration identifiers and communicate them to the application server 101. In that case the registration identifiers can encode user identifiers, identifying the associated user profiles 210.

When the application server 101 desires to communicate with a particular instance 210 of its associated application, the application server 101 may transmit a message to the message server 400 indicating the registration identifier of the intended application instance 210. The message server 400 may receive the message from the application server 101, and may process the message for delivery.

The message server 400 may be aware of the user profiles on the various computing devices 110 with which it is in communication. The message server 400 may associate each computing device 110 with a device identifier, and may associate each user profile with a user identifier. It will be understood that, assuming each computing device 110 has at least one user profile 250, there will exist at least as many user identifiers as device identifiers. Further, each device identifier may be associated with one or more user identifiers, while each user identifier may be associated with only a single device identifier.

For each application server 101, the message server 400 may include, or otherwise have access to, data for translating the registration identifiers used by the application server 101 to user identifiers of user profiles 250 running the various application instances. For example, this data may be stored in a database, which may be implemented in various ways, and need not be limited to a relational database. When the message server 400 receives a message from the application server 101, including or accompanied by a registration identifier, the message server 400 may translate the registration identifier into the user identifier representing the user profile 250 running the application instance 210 represented by the registration identifier.

At this point, the message server 400 now has the message and may associate it with a user profile 250 and a computing device 110.

The messaging server 300 may transmit each message for a user profile 250 to the computing device 110 associated with that user profile 250. Traditionally, only a single current network connection exists between the messaging server 300 and the computing device 110 in question. According to an example implementation of the disclosed technology, the messaging server 300 may multiplex that network connection, to create two or more virtual connections within the single network connection.

In an example implementation the multiplexing may occur by associating each message, during transmission to the computing device 110, with the user identifier of the intended-recipient user profile 250. This association may be implemented in various ways. For example, and not limitation, the message may be sent along with a separate message carrying the user identifier. Alternatively, the messaging server 300 may modify the message, such as a metadata portion of the message, to include the user identifier.

As a result, the single connection between a computing device 110 and the messaging server 300 may behave as multiple connections, one for each user profile 250 on the computing device 110.

When the computing device 110 receives the message, the computing device 110 may identify the user profile 250 for which the message is intended, based on encoding of the user identifier in or accompanying the message. When the computing device 110 receives one or more messages for a user profile 250, that user profile 250 captures and processes the messages. More specifically, in some implementations, the computing device 110 may have multiple broadcast receivers running for the same application, when multiple instances of that application are running within different user profiles. In that case, the broadcast receiver that is identified by the user identifier of the message may capture and process the message. Accordingly, only a single user profile 250 on the computing device may process the received message.

Figure 3:
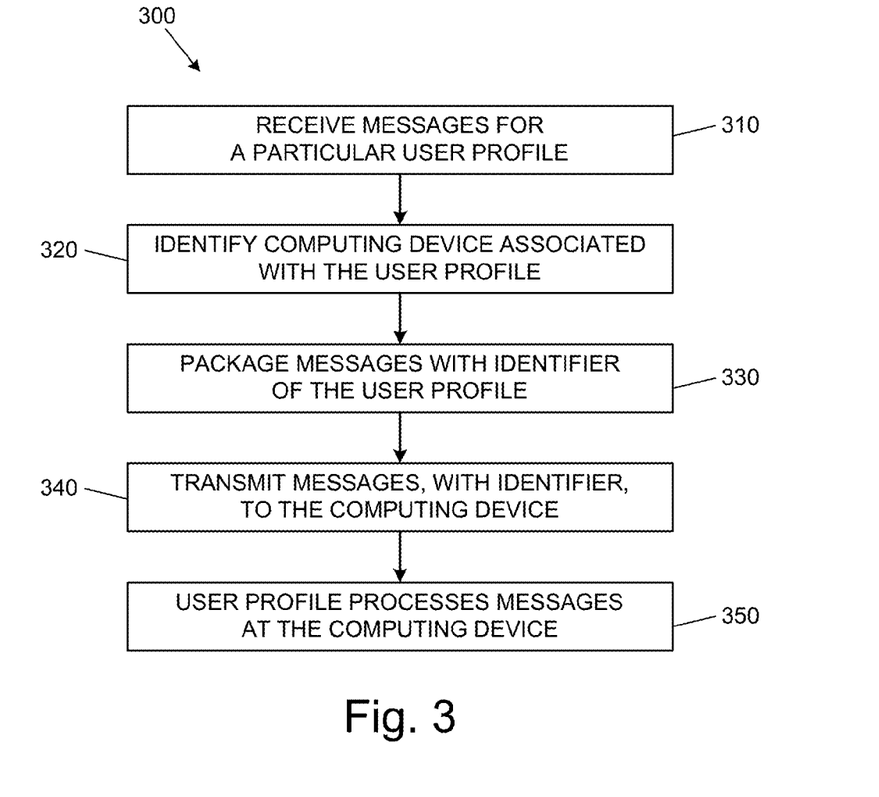
FIG. 3 is a flow diagram of a method for managing message delivery, according to an implementation.

FIG. 3 illustrates a flow diagram of a method 300 according to the disclosed technology. As shown, at 310, one or more messages are received by the computing system 400 for a particular user profile. At 320, the computing system 400 may determine the computing device 110 associated with the user profile. At 330, computing system 400 may encode the messages, or a package to accompany the messages, with the user identifier of the intended-recipient user profile. At 340, the computing system 400 may transmit the messages, including an indication of the intended-recipient user profile, to the computing device 110 associated with the user profile. At 350, the user profile may process the messages.

It will be understood that the various steps shown in FIG. 3 are illustrative only, and that steps may be removed, other steps may be used, or the order of steps may be modified. It will also be understood that user profile updates from the computing device 110 may be received at various points throughout the method 300, especially if provided autonomously by the computing device 110.

Figure 4:
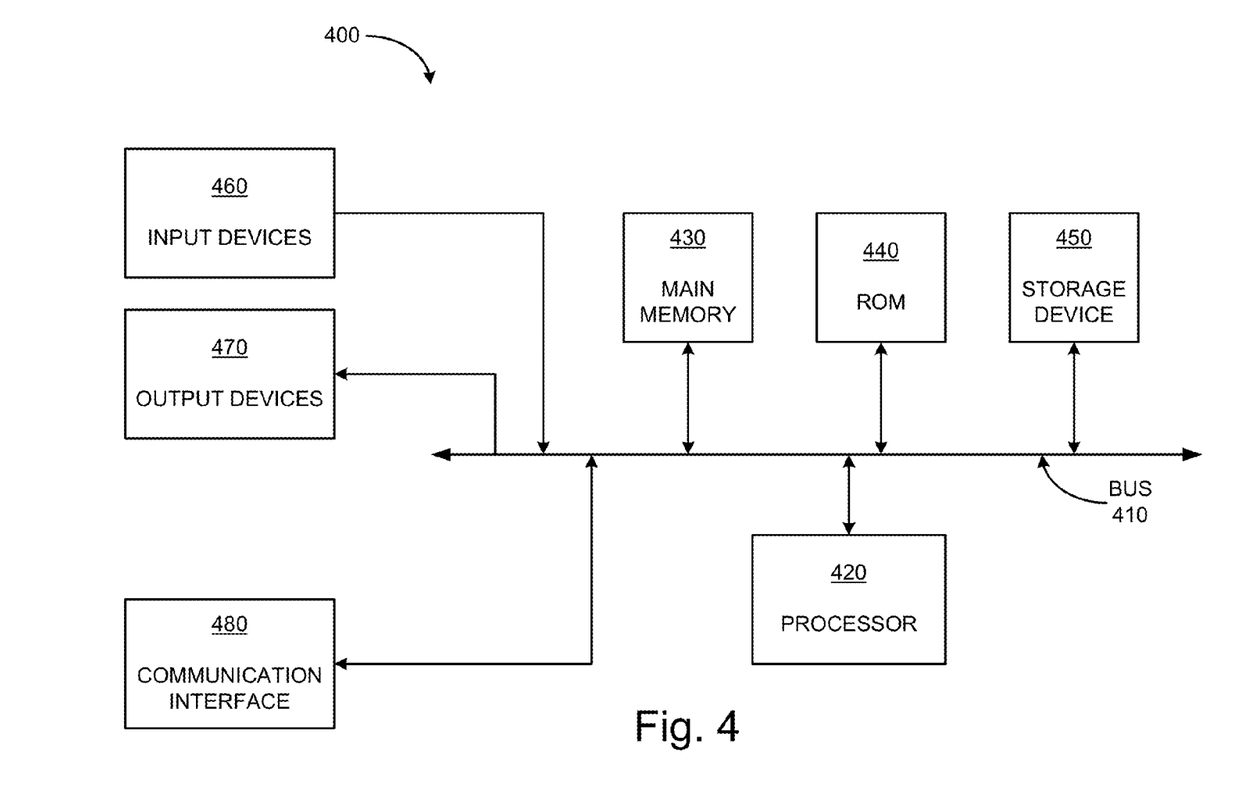
FIG. 4 is a diagram of an architecture of a computing system, according to an implementation.

Various implementations of the messaging systems 100 and methods may be embodied in transitory or non-transitory computer readable media for execution by a computer processor. FIG. 4 is a diagram of an example architecture of a message server 400, in an implementation consistent with the disclosed technology. As shown, the message server 400 may include a bus 410, a processor 420, a main memory 430, a read only memory (ROM) 440, a storage device 450, one or more input devices 460, one or more output devices 470, and a communication interface 480. The bus 410 may include one or more conductors that permit communication among the components of the message server 400.

The processor 420 may be one or more conventional processors or microprocessors that interpret and execute instructions, such as instructions for providing aspects of the disclosed technology. The main memory 430 may include a random access memory (RAM) or another dynamic storage device that stores information and instructions for execution by the processor 420. The ROM 440 may include a conventional ROM device or another type of static storage device that stores static information or instructions for use by the processor 420. The storage device 450 may include a magnetic or optical recording medium and its corresponding drive.

The input devices 460 may include one or more mechanisms that permit an operator to input information to the message server 400, such as a keyboard, a mouse, a pen, voice recognition, or biometric mechanisms. The output devices 470 may include one or more mechanisms that output information to an operator, including a display, a printer, or a speaker. The communication interface 480 may include any transceiver-like mechanism that enables the message server 400 to communicate with remote devices or systems, such as a mobile device or other computing device 110 to which messages are delivered. For example, the communication interface 480 may include mechanisms for communicating over a network.

As discussed above, the message server 400 may manage message delivery to a plurality of computing devices 110. The message server 400 may perform tasks to that end in response to the processor 420 executing software instructions contained in a computer-readable medium, such as memory 430. The software instructions may be read into memory 430 from another computer-readable medium, such as the data storage device 450, or from another device via the communication interface 480. Alternatively, or additionally, hardwired circuitry may be used in place of or in combination with software instructions to implement processes consistent with the disclosed technology. Thus, the disclosed technology is not limited to any specific combination of hardware circuitry and software.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method comprising:
receiving, at a computing system, a plurality of messages for a plurality of mobile devices remote from the computing system, including a first mobile device comprising a first user profile and second user profile configured to run simultaneously, wherein each of the first and second user profiles represents a different user of the first mobile device, wherein only a single network connection exists between the computing system and the first mobile device during a current communications session, and wherein the first user profile is configured to run a first instance of an application, and wherein the second user profile is configured to run a second instance of the application independent of the first instance while the first user profile is running the first instance;
associating the first user profile with a first user profile identifier;
associating the second user profile with a second user profile identifier;
receiving a first message directed toward the first instance of the application;
packaging the first message with the first user profile identifier, based on the first message being directed to the first instance of the application; and
transmitting the first message, along with the first user profile identifier, to the first mobile device.

2. The method of claim 1, wherein the first message is received from an application server associated with the application, and wherein the first message is directed from the application server to the first instance of the application.

3. The method of claim 2, further comprising:
receiving a second message from the application server directed toward the second instance of the application;
identifying the second instance of the application as running on the second user profile;
packaging the second message with the second user profile identifier; and
transmitting the second message, along with the second user profile identifier, to the first mobile device.

4. The method of claim 3, further comprising transmitting both the first message and the second message to the mobile device across the single network connection.

5. The method of claim 1, further comprising multiplexing the single network connection transmitting messages for the first user profile and for the second user profile through the same single network connection.

6. The method of claim 1, further comprising:
providing a second single network connection between the computing system and a second mobile device of the plurality of mobile devices;
associating a first device identifier with the first mobile device; and
associating a second device identifier with the second mobile device.

7. The method of claim 6, further comprising mapping each user profile identifier to the device identifier of the mobile device on which the user profile associated with the user profile identifier runs.

8. A computer program product comprising a non-transitory computer-readable storage medium with instructions executable by one or more processors to perform a method, the method comprising:
receiving, at a message server, a plurality of messages from an application server associated with an application, the plurality of messages being directed toward a plurality of mobile devices at remote locations, including a first mobile device, wherein only a single network connection currently exists between the message server and the mobile device;
associating a first registration identifier with a first instance of the application running on a first user profile of the first mobile device, wherein the first user profile comprises a first set of applications and preferences;

associating a second registration identifier with a second instance of the application running on a second user profile of the first mobile device, while the first instance of the application simultaneously runs on the first user profile, wherein the second user profile comprises a second set of applications and preferences;

identifying a first message in the plurality of messages as being directed toward the first instance of the application; and pushing the first message to the first mobile device, along with a first user identifier representing the first user profile;

wherein the first user profile and the second user profile are configured to run simultaneously wherein each of the first and second user profiles represents a different user of the first mobile device.

9. The computer program product of claim 8, the method further comprising:

identifying a second message in the plurality of messages as being directed toward the second instance of the application; and multiplexing the single network connection from the message server to the mobile device by, in addition to pushing the first message through the single network connection to the first mobile device along with the first user identifier, also pushing the second message through the single network connection to the first mobile device along with a second user identifier, wherein the second user identifier represents the second user profile.

10. The computer program product of claim 8, wherein the plurality of mobile devices each have one or more user profiles, the method further comprising:

associating a device identifier with each of the plurality of mobile devices; and associating a user profile identifier with each of the user profiles.

11. The computer program product of claim 10, the method further comprising mapping each user profile identifier to the device identifier of the corresponding mobile device of the plurality of mobile devices on which the user profile associated with the user profile identifier runs.

12. The computer program product of claim 11, the method further comprising mapping each of the plurality of messages to a user profile identifier and to an associated device identifier to which the user profile identifier is mapped.

13. The computer program product of claim 8, wherein the first user identifier is encoded in the first registration identifier.

14. A messaging system comprising:

a computing system in communication with a plurality of mobile devices, including a first mobile device having a first user profile and a second user profile configured to run simultaneously, wherein each of the first and second user profiles represents a different user of the first mobile device, the computing system being configured to receive a plurality of messages, each including an associated registration identifier;

a database configured to map a first registration identifier of a first message of the plurality of messages to the first user profile, and to map a second registration identifier of a second message of the plurality of messages to the second user profile; and a communication interface configured to connect to the mobile device over a single network connection in a current communication session;

wherein the computing system is further configured to multiplex the single network connection by transmitting the first message to the mobile device along with a first user identifier associated with the first user profile, and by transmitting the second message to the mobile device along with a second identifier associated with the second user profile; and wherein the computing system is in communication with an application server associated with an application, and wherein a first instance of the application runs in the first user profile of the mobile device, and a second instance of the application runs in the second user profile of the mobile device while the first instance of the application simultaneously runs on the first user profile.

15. The system of claim 14, wherein the first message is received from the application server and directed to the first instance of the application, and wherein the second message is received from the application server and directed to the second instance of the application.

16. The system of claim 14, wherein the first user identifier is encoded in the first registration identifier.

17. The system of claim 14, the first user identifier being encoded in the first registration identifier, and the second user identifier being encoded in the second registration identifier.

18. The system of claim 17, the computing system being further configured to map the first user identifier to the mobile device.

19. The system of claim 18, the computing system being further configured to map the second user identifier to the mobile device.

* * * * *